April 20, 1965 A. N. SWEENY 3,178,973
BOX TURNING TOOL
Filed Sept. 18, 1961 2 Sheets-Sheet 1
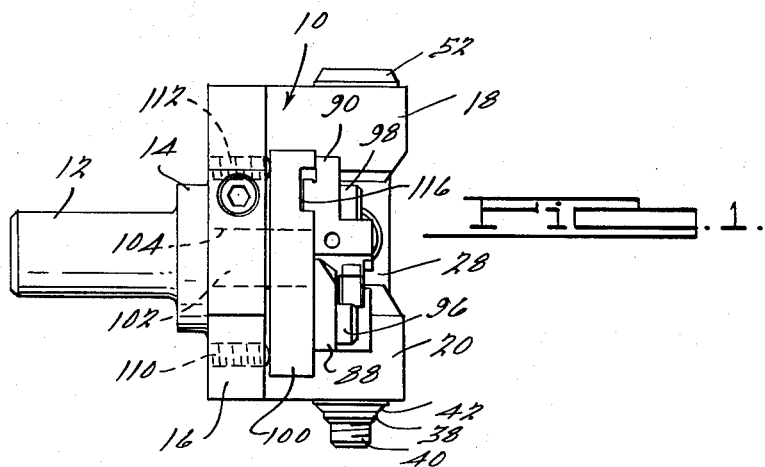
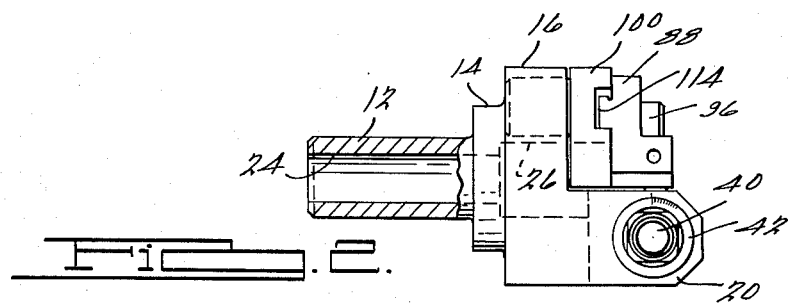
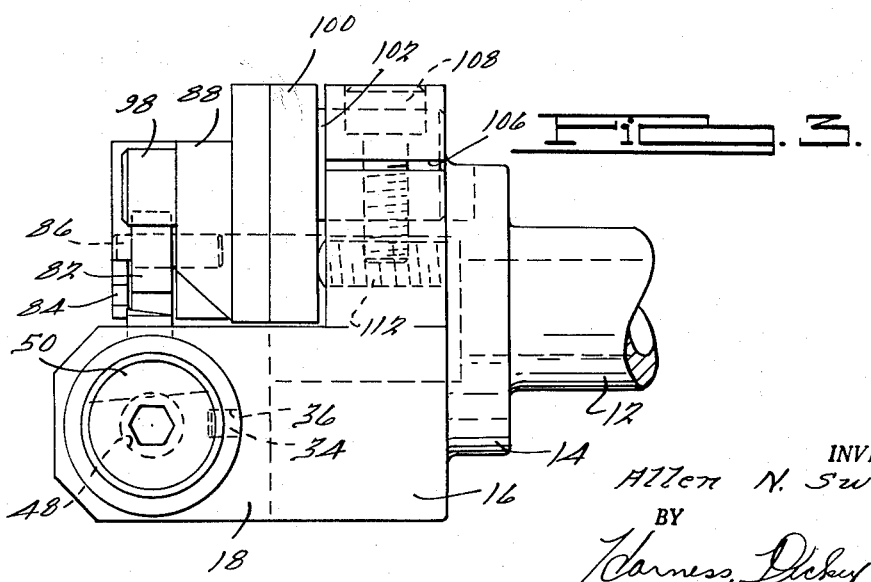
INVENTOR.
Allen N. Sweeny
BY
Harness, Dickey & Pierce
ATTORNEYS April 20, 1965     A. N. SWEENY     3,178,973
BOX TURNING TOOL
Filed Sept. 18, 1961     2 Sheets-Sheet 2
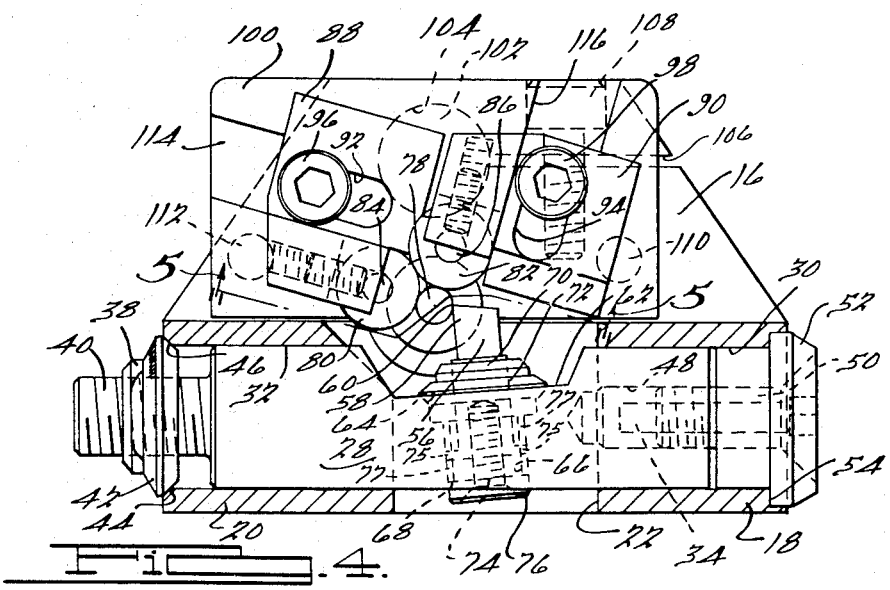
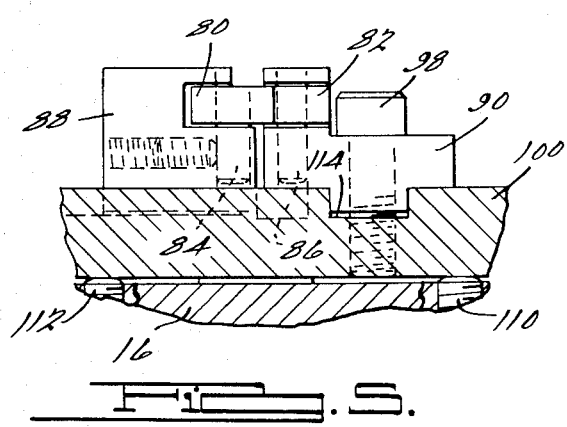
INVENTOR.
Allen N. Sweeny
BY
Harness, Dickey & Pierce
ATTORNEYS

United States Patent Office 3,178,973
Patented Apr. 20, 1965

3,178,973
BOX TURNING TOOL
Allen N. Sweeny, Grosse Pointe, Mich., assignor to De Vlieg Machine Company, Royal Oak, Mich., a corporation of Michigan
Filed Sept. 18, 1961, Ser. No. 138,671
7 Claims. (Cl. 82—35)

This invention relates to metal cutting tools and particularly to a box turning tool.

It is an object of the present invention to provide a cutting tool particularly suited for turning small diameter workpieces in automatic screw machine operations or other high production equipment.

It is another object of the present invention to provide a box turning tool of rugged and sturdy construction which is operable to rigidly support a cutting edge in the desired location.

It is still another object of the present invention to provide a box turning tool in which the cutting edge may be accurately adjusted in any direction within a given plane.

It is a still further object of the present invention to provide a metal cutting tool for turning operations having means oppositely disposed to the cutting edge for reinforcing and backing the work.

It is still another object of the present invention to provide a box turning tool in which the location of the rollers may be adjusted to compensate for the grinding of the cutting element.

These and other objects of the present invention will become apparent from the following detailed description taken in conjunction with the accompanying drawings wherein:

FIGURE 1 is a plan view of a tool embodying the features of the present invention;

FIG. 2 is a left-hand end elevational view, partly in section, of the structure illustrated in FIGURE 1;

FIG. 3 is an enlarged right-hand elevational view of the structure illustrated in FIGURE 1;

FIG. 4 is an enlarged front elevational view, with parts broken away, of the structure illustrated in FIGURE 1; and FIG. 5 is a fragmentary sectional view of the structure illustrated in FIG. 4, taken along the line 5—5 thereof.

The tool of the present invention falls generally into the category of box turning tools, but it may be more specifically characterized as a box roller turner tool, in view of the provision of rollers for backing the work. As will be seen in the drawings, the tool of the present invention includes a rugged machined metal body member 10 having a rearwardly extending hollow shank portion 12, a cylindrical shoulder portion 14, a central base portion 16 and a pair of forwardly extending spaced bosses or supporting portions 18 and 20. A recess 22 is formed between the bosses 18 and 20. The shank 12 is outwardly circular cylindrical in shape and forms the mounting means by which the tool may be held in a chuck or other supporting device of the machine tool with which the unit is used. The shank is formed with a central elongated bore 24 which extends partially into the cylindrical shoulder portion 14 and communicates with a central bore or opening 26 extending from the shoulder portion 14 through the central base portion 16 and opens at the forward face of the body.

The bosses 18 and 20 serve to support a slide 28 in the form of a cylindrical bar and, for this purpose, they are provided with ways 30 and 32 in the form of cylindrical bores. The slide 28 is snugly but slidably supported within the bores 30 and 32 at its opposite ends. In addition, the slide 28 is fitted with a key 34 which slides within a keyway 36 formed in the boss 18. The slide 28 is thus held against rotation relative to the body 10. The slide may be positioned at varying locations along the axis of its movement by means which include a nut 38 threadably engaged on a threaded extremity 40 formed at one end of the slide 28. The nut 38 is provided with an integral adjusting collar portion 42 having a frusto-conical bearing surface 44 conformably engageable with a frusto-conical seat 46 formed at the outer end of the boss 20 and coaxially surrounding the bore 32. The opposite end of the slide 28 is provided with a threaded opening 48 adapted to receive a screw 50 the head of which engages within a washer 52 abutting against a shoulder 54 at the outer end of the boss 18. Thus, upon loosening of the screw 50, the nut 38 may be rotated to cause the slide 28 to move linearly along the ways 30 and 32 in a direction determined by the direction of rotation of the nut. When the slide has been positioned in its desired location, the screw 50 is tightened to draw the bearing surface 44 of the nut tightly against the seat 46.

The slide 28 serves to support a cutter element, as, for example, a cutter cartridge 56, which may itself be formed from a suitable cutting steel or may be provided with a tip 58 of tungsten carbide or other cutting material, which is ground to form a cutting edge 60. For this purpose, the slide 28 is formed with a recess 62 having a frusto-conical or tapered seat 64 communicating with a bore 66 which, in turn, provides an opening to a shoulder 68 oppositely disposed from the seat. The cartridge 56 is externally threaded and threadably receives a nut 70 having an integral collar portion 72 adapted to be drawn conformably against the seat 64. A screw 74 is threaded into the rear end of the cartridge and has its head engageable within a washer 76 adapted to be drawn against the shoulder 68. Thus, upon tightening of the screw 74, the collar portion 72 will be drawn against the seat 64 and the washer 76 will be held against the shoulder 68. Keys 75 are formed on the rear end of the cartridge 56, which ride in keyways 77 formed in the bore 66, to hold the cartridge against rotation. Thus, upon loosening of the screw 74, the nut 70 may be rotated to adjust the cutter cartridge 56 linearly along its axis to any desired position. The axis of the cutter cartridge is shown herein as being substantially transverse to the axis of the slide 28, although slightly offset from a perfectly transverse position. It will, of course, be appreciated that the axis of adjustment of the cutter cartridge 56 may be disposed at varying angles relative to the axis of the slide 28 and, as used herein, the expression "substantially transverse" is intended to include a variety of angles of the cutter cartridge 56 offset from a perfectly transverse position.

During normal use, the tool is non-rotatably held by the shank 12, while a workpiece, illustrated at 78, is driven in rotation and may be fed into the openings 24 and 26 as the tool is advanced along the length of the workpiece. To assure that the workpiece will be accurately turned to the desired diameter and to prevent its deflection away from the cutting edge, two roller elements 80 and 82 are positioned to engage the workpiece on sides thereof substantially opposite from the cutting edge. The rollers 80 and 82 are supported on pins 84 and 86, respectively, for rotation about axes parallel to the axis of rotation of the work, which axis is substantially perpendicular to both the axis of the slide 28 and, also, the axis of adjustment of the cutter element 56. Thus, the rollers 80 and 82 are free to rotate together with the work. The pins 84 and 86 are carried by blocks 88 and 90 having elongated openings 92 and 94, respectively, adapted to receive the shanks of screws 96 and 98. The screws 96 and 98 extend freely through the openings 92 and 94 and are threaded into a mounting head 100. The mounting head 100 has a cylindrical shank 102 which is fitted within a bore 104 formed in the base portion 16 of the body 10. The base portion 16 is laterally split or separated as indicated at 106 and the portions thereof on opposite sides of the split 106 may be drawn together by means of a screw 108 to cause the shank portion 102 to be clamped firmly within the opening 104. The position of the head 100 is adjusted by loosening the screw 108 and adjusting two set screws 110 and 112. The head 100 is then drawn up against the set screws 110 and 112 and the screw 108 is tightened to clamp the head 100 in position. After the face of the tip 58 of the cutter element 56 has been worn down somewhat by the grinding operations, the head 100 may be adjusted slightly to maintain the outer faces of the rollers 80 and 82 slightly rearwardly of the face of the cutting tool and the cutting edge 60 as seen in FIG. 3.

As illustrated in FIG. 4, the head 100 is provided with grooves 114 and 116 which slidably receive portions of the blocks 88 and 90, respectively, for adjustment of the rollers to accommodate varying diameter workpieces. For this purpose, the screws 96 and 98 are first loosened, to permit adjustment of the blocks 88 and 90 along the grooves 114 and 116 to the desired position, and the screws 96 and 98 are then retightened. By adjustment of the slide 28 along its axis and the adjustment of the cutter element 56 along its axis, the cutting edge 60 may be moved in any direction in a given plane and caused to contact the workpieces at any desired position. Thus, as a workpiece is driven in rotation and moved longitudinally through the bores 24 and 26, the work will be supported and backed by the rollers 80 and 82 as material is removed from the outer surface thereof by the cutting edge 60 of the cutter element 56.

It will be seen that the recess 22 between the bosses 18 and 20 provides access to the screw 74, which must be loosened in order to adjust the position of the cutter element 56. Furthermore, the mass of spaced bosses 18 and 20 securely supports the slide 28 and resists any force tending to deflect the slide 28 or displace the cutter element 56 in a direction along its axis. Coincidentally, the means by which the slide is locked in position provides a method for accurately adjusting the slide a predetermined distance and thereafter locking the slide in the desired position.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A metal cutting tool including a body having spaced supporting portions provided with coaxial cylindrical way openings therethrough and a recess intermediate said ways, a slide non-rotatably supported in said openings for movement along a given axis, threaded means on said slide having a thread axis parallel to the axis of movement of said slide, said threaded means being cooperable with at least one of said supporting portions for establishing the position of said slide along its axis of movement, a bearing surface on said slide intermediate said supporting portions, a cutter element supported by said bearing surface for adjustment generally transversely of said slide axis, and roller means rotatably supported on said body in a position adapted to engage and support a workpiece contacted by said cutter element.

2. A metal cutting tool including a body having spaced supporting portions and a recess intermediate said supporting portions, said supporting portions having cylindrical way openings therethrough which are coaxial with one another, a slide supported in said openings for movement along a given axis, means defining an interfitting key and keyway on said slide and on at least one of said supporting portions for preventing rotation of said slide upon axial movement thereof, means for securing said slide in selected positions along said axis, a bearing surface on said slide intermediate said supporting portions, a cutter element supported by said bearing surface for adjustment generally transversely of said slide axis, and roller means rotatably supported on said body in a position adapted to engage and support a workpiece contacted by said cutter element.

3. A metal cutting tool including a body having spaced supporting portions provided with aligned way openings therethrough, a slide extending between and non-rotatably supported in said openings for movement along a given axis, oppositely facing shoulder portions on the outer sides of said supporting portions, adjustable means on said slide engageable with said shoulder portions for locking said slide in selected positions along the axis of adjustment thereof, a bearing surface on said slide intermediate said supporting portions, means on said body defining a work receiving guide opening extending perpendicular to the axis of movement of said slide, a cutter element supported by said bearing surface for adjustment generally transversely of said slide axis, and roller means rotatably supported on said body in a position adapted to engage and support a workpiece contacted by said cutter element.

4. A metal cutting tool including a body having spaced supporting portions privided with aligned way openings, a slide extending between and supported in said openings for non-rotational movement along a given axis, adjustable means engageable with opposite sides of said supporting portions for securing said slide in selected positions along said axis, said adjustable means having a collar threaded on one end of said slide about a thread axis coaxial with the axis of movement of said slide and engageable with one of said supporting portions, a bearing surface on said slide intermediate said supporting portions, a cutter element supported by said bearing surface for adjustment generally transversely of said slide axis, said body having an aperture through which work is adapted to be linearly advanced into engagement with said cutter element, a mounting head on said body adjustable in a direction parallel to the direction of work advancement, and roller means rotatably supported on said mounting head in a position adapted to engage and support a workpiece contacted by said cutter element.

5. A metal cutting tool including a body having spaced supporting portions provided with aligned way openings therethrough, a slide extending between and supported in said openings for movement along a given axis, meas for securing said slide in selected positions along said axis, a bearing surface on said slide intermediate said supporting portions, a cutter element supported by said bearing surface for adjustment generally transversely of said slide axis, means on said body defining a work receiving guide opening extending perpendicular to the axis of movement of said slide; and roller mounting blocks carried by said body member for adjustment along axes which are substantially perpendicular to one another and are disposed in a plane perpendicular to the length of said guide opening and a roller carried by each of said roller mounting blocks adapted to be adjusted into engagement with a workpiece contacted by said cutter element upon adjustment of said roller mounting blocks for supporting a workpiece as it is being machined by said cutter element.

6. A metal cutting tool including a body having spaced supporting portions and a recess intermediate said supporting portions, said supporting portions having coaxial cylindrical way openings therethrough, a slide extending between and supported in said way openings for movement along the axis thereof, means defining an interfitting key and keyway on said slide and at least one of said supporting portions for preventing rotation of said slide and a cutter element supported on said slide between said supporting portions for adjustment in a direction generally transverse to the axis of said way openings.

7. A metal cutting tool including a body having spaced supporting portions and a recess intermediate said supporting portions, said supporting portions having coaxial through cylindrical way openings, a slide extending between and supported by said opening for non-rotational adjustment along the axis of said way openings, an adjusting collar threaded on said slide at one end thereof about the axis of said way openings, a shoulder on the outer surface of one of said supporting portions against which said collar is engageable, a threaded locking member threadably engageable with the other end of said slide on a thread axis coaxial with said ways and cooperable with the outer surface of the other of said supporting portions for drawing said adjusting collar against said shoulder, and a cutter element supported on said slide between said supporting portions for adjustment in a direction generally transverse to the axis of said way openings.

References Cited by the Examiner
UNITED STATES PATENTS

| | | | |
|---|---|---|---|
| 2,265,487 | 12/41 | Koski | 82—35 |
| 2,379,307 | 6/45 | Lawson et al. | 82—35 |
| 2,380,039 | 7/45 | Gideon | 82—35 |
| 2,849,902 | 9/58 | De Vlieg et al. | 77—58 |

WILLIAM W. DYER, JR., *Primary Examiner.*

RICHARD H. EANES, *Examiner.*